United States Patent
Okitsu et al.

(10) Patent No.: US 7,143,116 B2
(45) Date of Patent: Nov. 28, 2006

(54) METHOD OF CONTROLLING TOTAL DISK USAGE AMOUNT IN VIRTUALIZED AND UNIFIED NETWORK STORAGE SYSTEM

(75) Inventors: Jun Okitsu, Kokubunji (JP); Shinichi Kawamoto, Hachioji (JP); Atsushi Ebata, Yokohama (JP); Yoshiko Yasuda, Tokorozawa (JP); Tatsuo Higuchi, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 586 days.

(21) Appl. No.: 10/650,843

(22) Filed: Aug. 29, 2003

(65) Prior Publication Data

US 2005/0044198 A1    Feb. 24, 2005

(30) Foreign Application Priority Data

Aug. 8, 2003    (JP)    .............................. 2003-206646

(51) Int. Cl.
*G06F 12/00* (2006.01)

(52) U.S. Cl. ...................... 707/200; 707/100; 709/226; 709/229

(58) Field of Classification Search ................ 707/100, 707/200
See application file for complete search history.

(56) References Cited

U.S. PATENT DOCUMENTS

| | | | |
|---|---|---|---|
| 5,619,690 A * | 4/1997 | Matsumani et al. | ........ 707/200 |
| 5,819,047 A | 10/1998 | Bauer et al. | |
| 6,032,216 A | 2/2000 | Schmuck et al. | |
| 6,092,163 A | 7/2000 | Kyler et al. | |
| 6,820,122 B1 | 11/2004 | Mandler et al. | |
| 6,889,249 B1 | 5/2005 | Miloushev et al. | |
| 6,950,871 B1 * | 9/2005 | Honma et al. | .............. 709/226 |
| 2002/0023156 A1 | 2/2002 | Chujo et al. | |
| 2002/0166117 A1 * | 11/2002 | Honma et al. | .............. 709/226 |
| 2002/0194325 A1 * | 12/2002 | Chmaytelli et al. | ......... 709/224 |
| 2003/0009484 A1 * | 1/2003 | Hamanaka et al. | ......... 707/200 |
| 2003/0110254 A1 | 6/2003 | Fujita et al. | |
| 2003/0194325 A1 * | 10/2003 | Schoenmeyr | ................ 417/32 |
| 2004/0044698 A1 | 3/2004 | Ebata et al. | |
| 2005/0033625 A1 * | 2/2005 | Kline | ........................... 705/9 |

OTHER PUBLICATIONS

DiskXtender 2000, Infinite Storage for Enterprise Data, Legato Solutions.
C. Karamanolis, DiFFS: a Scalable Distributed File System, Internal Accession Date Only, Hewlett-Packard Company 2001, pp. 1-6.
Y. Yasuda, et al: U.S. Appl. No. 10/387,382.
S. Kawamoto, et al: U.S. Appl. No. 10/335,853.

* cited by examiner

*Primary Examiner*—Don Wong
*Assistant Examiner*—Binh Van Ho
(74) *Attorney, Agent, or Firm*—Mattingly, Stanger, Malur & Brundidge, P.C.

(57) ABSTRACT

A system includes at least a user and a file system connected to the user through a network. An estimated write size of a write operation of the user into the file system is managed as an accumulated value. The timing of judging the limit of the disk usage amount is specified from the accumulated value and a predetermined threshold value, and the limit of the disk usage amount is judged at the specified timing, so that disk usage amount by a user may be limited and managed.

3 Claims, 8 Drawing Sheets

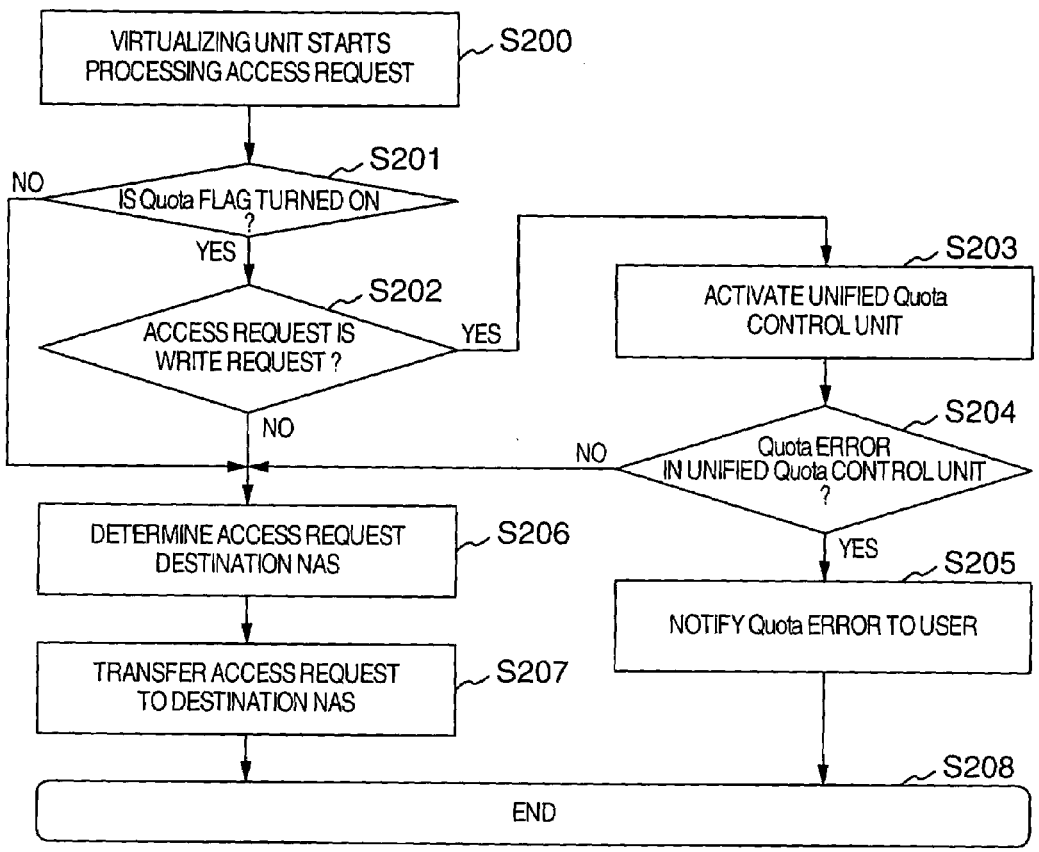

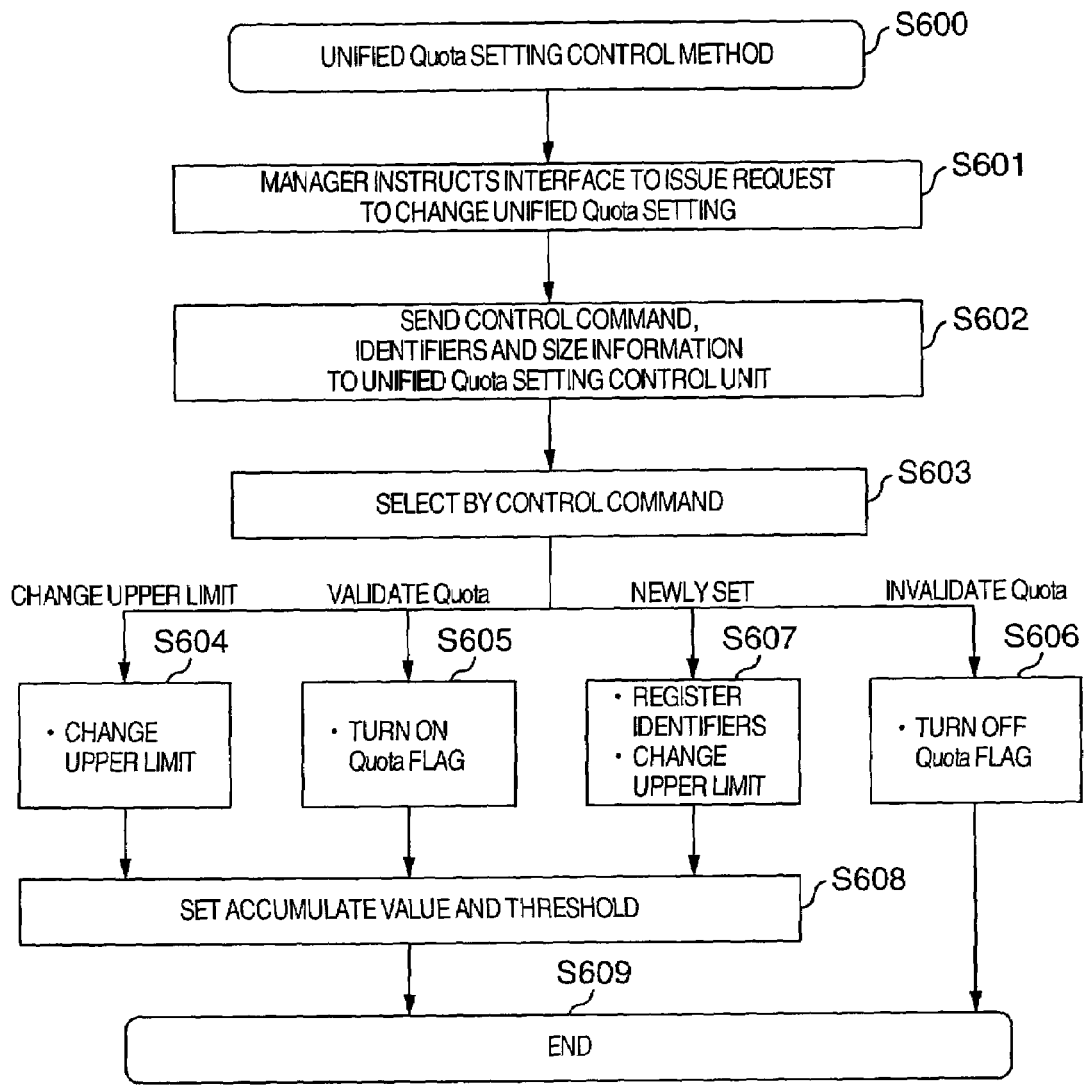

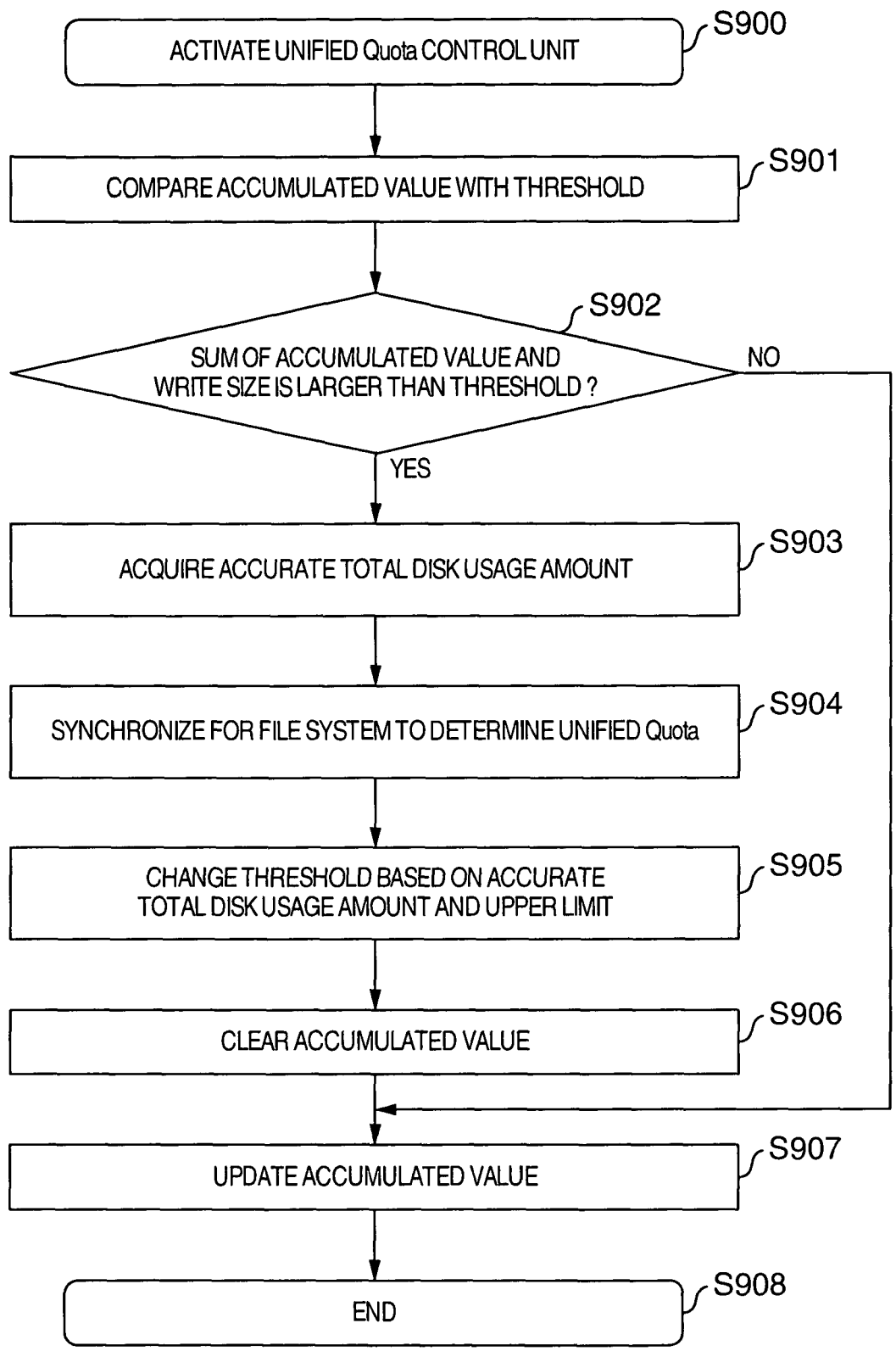

METHOD OF CONTROLLING TOTAL DISK USAGE AMOUNT IN VIRTUALIZED AND UNIFIED NETWORK STORAGE SYSTEM

CROSS-REFERENCE TO RELATED APPLICATION

This application is related to U.S. patent application Ser. No. 10/335,853, filed Jan. 3, 2003, entitled "System and Method for Virtualizing Network Storage into a Single File System View", U.S. patent application Ser. No. 10/387,382, filed Mar. 14, 2003, entitled "System and Method for Virtualizing Network Storage into a Single File System View", and U.S. patent application Ser. No. 10/646,894, filed Aug. 25, 2003, entitled "Method for Rebalancing Free Disk Space among Network Storages Virtualized into a Single File System View", the contents of which are incorporated herein by reference.

BACKGROUND OF THE INVENTION

The present invention relates to the function of limiting the total or storage-system-wide amount of occupied disk spaces (hereinafter called a total disk usage amount) of a user or a user group in an environment involving a plurality of network storage. The term "user" is hereinafter defined as a single user or a user group including a plurality of users.

In the prior art, the data of a client is stored in a storage directly connected to the client (direct attached storage: DAS), and the data on the DAS is accessible only through the client directly connected. With the recent development of the network technique, however, a method has been spreading in which the storage is separated from the client and connected to the network so as to be accessible through the network. The storage connected to the network in this way is called the network storage (NAS). The NAS makes it possible to share the data among a plurality of clients, and therefore the manager can manage the shared data efficiently.

In the case where the amount of the data shared by a plurality of clients is increased to such an extent as to exceed the disk capacity of a single NAS, the manager adds a new NAS. The addition of a new NAS solves the problem of disk capacity. Nevertheless, each time a NAS is added, the setting in the system is required for all the clients, thereby leading to an increased management cost. As a method of suppressing the management cost, a virtually unifying technique for NAS has been under study in which a plurality of NASs are caused to appear as a single NAS from the clients and the whole system is not affected by the addition of a new NAS.

In the case where a plurality of users share a NAS and a given user sharing the NAS uses a great amount of disks in the NAS, on the other hand, the use of the disks by other users sharing the NAS is inconveniently limited. In order that a user sharing the NAS may not limit the use of other users inconveniently, the user's act to use the disks of the NAS is required to be limited. Means generally used for this limitation is the function to limit the disk usage amount of each user (quota function).

An example of the virtually unifying technique for NAS is described in http://potal2.ligato.com/resources/detasheets/D124.pdf (reference 1). According to this method, a NAS called primary storage manages the file location information in a centralized manner, so that a plurality of NASs are caused to virtually appear as a single NAS.

Another method for virtualizing multiple NASs is described in DiFFS: a Scalable Distributed File System, Christos Karamanolis et. al., HP Laboratories Palo Alto, HPL-2001-19, Jan. 24, 2001 (reference 2). The method is that a plurality of NASs are caused to appear as a single NAS by a non-centralized management server system different from the centralized management server system described above.

According to the function known as the disk usage amount limiting function, the manager sets an upper limit of the disk usage amount of each user for the NAS. The user for whom the upper limit of disk usage amount has been set cannot write into NAS beyond the particular disk usage amount upper limit even in the case where the NAS has a sufficient residual capacity. The NAS having the disk usage amount limiting function, upon receipt of a write request from a user, judges the limit of the disk usage amount. In the case where the set upper limit of disk usage amount is exceeded by the disk usage amount of the user due to the write request, an error (quota error) to the effect that the disk usage amount upper limit has been exceeded is notified to the particular user, who is subsequently prohibited from issuing a write request for using a new disk area.

In the prior art, this disk usage amount limiting function is packaged in the OS or file system of the NAS, and has worked for each NAS. For example, the disk quota in the FreeBSD constituting a free operating system or in NTFS5 of Windows 2000 (trade mark) of Microsoft works for each computer. In the case where a single NAS runs short of capacity and a plurality of NASs are used as described above, however, the function is required to limit the disk usage amount totally or storage-system-widely (hereinafter called "totally") for a plurality of NASs but not for each NAS.

A technique for limiting the disk usage amount totally for a plurality of NASs as a whole is described in U.S. Pat. No. 5,819,047 (reference 3). The feature of this technique lies in that the upper limit of disk usage amount is stored for each user in a storage-system-wide or unified account data base (hereinafter called a unified account data base) for a plurality of NASs, and each time the user attempts to write in NAS, the account data base is requested to determine whether the NAS is available for use or not.

US Patent Publication No. 2002/0,023,156 (reference 4), on the other hand, discloses a method of improving the efficiency of the disk usage amount limiting function for a system comprising a plurality of computers and one or a plurality of shared storage. The residual disk capacity available for each user is distributed to each computer in the form of reserved space beforehand, and upon receipt of a write request from the user, the limit of disk usage amount for the particular computer is judged, and the value of the reserved space held locally by the computer is manipulated to suppress the inquiries from the computer to the shared storage with respect to the residual disk capacity available for use through a network, thereby improving the efficiency.

SUMMARY OF THE INVENTION

In references 1 and 2, a virtualized and unified NAS system is realized. Nevertheless, the function of totally limiting the disk usage amount is not realized in the virtualized and unified NAS system.

In references 3 and 4, on the other hand, the function of limiting the disk usage amount totally for a plurality of NASs is realized. These methods, however, fail to correspond to a virtualized and unified NAS system having a plurality of NASs as component elements.

In reference 3 above, each time of the user's write operation, a request occurs to the account data base through the network. Thus, the network traffic increases for a reduced performance.

Reference 4 describes a method using the reserved space to improve the efficiency. The reserved space is closely related to the residual disk capacity available for the user. An effort to improve the efficiency using the reserved space, therefore, also reduces the performance as the network traffic is increased in order to maintain the coordination of the available residual disk capacity between the computers.

A first object of the invention is to provide an efficient function of totally limiting the disk usage amount for a virtualized and unified NAS system.

A second object of the invention is to provide an efficient function of limiting the disk usage amount totally by reducing the network traffic for the environment involving a plurality of NASs.

The first object of the invention is achieved by a virtualizing apparatus for realizing a virtualized and unified NAS system in which the rough write size of the user is managed as an accumulated value and the number of times the limit of disk usage amount is judged using the accumulated value is reduced. From the accumulated value and a predetermined threshold value, the timing is specified to judge the limit of the disk usage amount, and coordination is established between the NASs for judging the disk usage amount limit only at the particular timing. Therefore, the network traffic is reduced.

The second object of the invention is achieved by managing the rough write size of the user in each NAS as an accumulated value and reducing the number of times the disk usage amount limit is judged using the accumulated value. From the accumulated value and a predetermined threshold value, the timing is specified for judging the disk usage amount limit. The coordination is taken between the NASs for judging the disk usage amount limit only at the particular timing, and therefore the network traffic is reduced.

According to a first aspect of the invention, there is provided a storage-system-wide or unified quota management method (hereinafter called a unified quota management method) for limiting the disk usage amount of the user and the user group totally for a plurality of network storage, wherein each network storage includes a file system having the quota function, a remote quota server, a storage-system-wide or unified quota information table (hereinafter called a unified quota information table), and a storage-system-wide or unified quota control unit (hereinafter called a unified quota control unit), and wherein the unified quota information table includes an identifier, an upper limit, a threshold value and an accumulated value.

The upper limit value is the one of the total disk usage amount set for each user or each user group. The threshold value includes both an upper limit value for each user or each user group and a virtual upper limit value determined in accordance with the upper limit value and the disk usage amount for each user or each user group. The accumulated value is the one of the write size due to the write request for each user or each user group.

The unified quota control unit includes the function of executing the step of comparing the accumulated value with the threshold value (step A) and the step of updating the accumulated value. In the case where step A shows that the accumulated value exceeds the threshold value, the step of accessing the remote quota server of each network storage subjected to unified quota management and determining the accurate total disk usage amount for each user or each user group, and the step of clearing the accumulated value in the unified quota information table in the network storage subjected to unified quota management, thereby saving the network access for controlling the quota.

Further, in the case where the accumulated value is found to exceed the threshold value as the result of executing the step A, the unified quota control unit compares the accurate total disk usage amount for each user or each user group with the upper limit set in the unified quota information table.

Further, in the case where the accumulated value is found to exceed the threshold value as the result of executing the step A, the unified quota control unit may change the threshold value based on the accurate total disk usage amount and the upper limit for each user or each user group.

The accumulated value in the unified quota information table is an accumulated value of the write size calculated in accordance with the attribute information on the write request of each user or each user group for the network storage, and preferably larger than the accumulated value of the write size accurately measured. Nevertheless, the write size can be estimated by other methods.

Further, in the case where the accumulated value is found to exceed the threshold value as the result of executing the step A, the unified quota control unit may access the remote quota server of the network storage in order to change the setting of the upper limit of the user and the user group in the file system quota function in such a manner as to synchronize the residual disk capacity available for the user and the user group in the network storage with the residual total capacity available for the user and the user group in the environment involving a plurality of network storage. In the process, the inspection may be carried out by the file system quota function as to whether the user and the user group is writable or not.

The step of inspecting whether the user and the user group is writable may include the step of changing the threshold value based on the accurate total disk usage amount and the upper limit for the user and the user group.

The value of accumulated write size calculated in accordance with the write request attribute information for each user or each user group for the network storage can be used as an accumulated value in the unified quota information table. This accumulated value is preferably larger than the accumulated value of the write size accurately measured.

According to a second aspect of the invention, there is provided a unified quota management method for limiting the disk usage amount of the user and the user group totally in a virtualized and unified network storage system comprising a virtualizing apparatus including a virtualizing unit, a file system having the quota function, and network storage having a remote quota server and a network, wherein a plurality of network storage are caused to appear to the user as a single virtual network storage.

This method uses a unified quota information table and a unified quota control unit. The unified quota information table includes an identifier, an upper limit value, a threshold value and an accumulated value. The upper limit value is the one of the total disk usage amount set for each user or each user group. The threshold value is a virtual upper limit set in accordance with the physical upper limit value and the disk usage amount for each user or each user group. The accumulated value is the one of the write size due to the write request for each user or each group.

The unified quota control unit executes the step of comparing the accumulated value of the write size due to the write request for each user or each user group with the threshold value (step B), the step of updating the accumulated value, the step of accessing the remote quota server of each network storage subjected to the unified quota management and determining an accurate total disk usage amount for each user or each user group in the case where the result of executing step B shows that the accumulated value exceeds the threshold value, the step of comparing the accurate total disk usage amount for each user or each user group with the upper limit value set in the unified quota information table, and the step of clearing the accumulated value in the unified quota information table. As a result, the access to the network storage for quota control can be saved.

In the unified quota management method, the unified quota control unit may execute the step of changing the threshold value based on the accurate total disk usage amount and the upper limit value for the user and the user group in the case where the accumulated value exceeds the threshold value.

The accumulated value in the unified quota information table is a value obtained by accumulating the write size calculated in accordance with the attribute information of the write request for each user or each user group, and may be larger than the accumulated value of the write size accurately measured.

According to a third aspect of the invention, there is provided a unified quota management unit for limiting the disk usage amount of the user and the user group totally in an environment involving a plurality of network storage. This unified quota management unit limits the disk usage amount of the user and the user group totally in an environment including a plurality of network storage. The network storage environment is configured of a file system having the quota function and a network storage having a remote quota server. The unified quota management unit includes a unified quota information table and a unified quota control unit.

The unified quota information table has an identifier, an upper limit value, a threshold value and an accumulated value. The upper limit value is the one of the total disk usage amount set for each user or each user group. The threshold value is a virtual upper limit value determined in accordance with the physical upper limit value and the disk usage amount for each user or each user group. The accumulated value is the one of the write size due to the write request for each user or each user group. The unified quota control unit includes a first comparator for comparing the accumulated value of the write size due to the write request for each user or each user group with the threshold value, a disk usage amount measuring unit for accessing the remote quota server of each network storage subjected to the unified quota management and determining the accurate total disk usage amount of the user and the user group, a second comparator for comparing the accurate total disk usage amount for the user and the user group with the upper limit value, an accumulated value reset unit for clearing the accumulated value, and an accumulated value update unit for updating the accumulated value based on the write size of the write request.

The unified quota control unit, upon receipt of a write request from the user and the user group, activates the first comparator, and in the case where the accumulated value is not more than the threshold value, does not activate the disk usage amount measuring unit, the second comparator and the accumulated value reset unit. In this way, the access to the network storage for quota control can be saved.

The unified quota control unit may include a unit for changing the threshold value based on the accurate total disk usage amount and the upper limit value.

The accumulated value in the unified quota information table is a value obtained by accumulating the write size calculated in accordance with the attribute information of the write request for each user or each user group, and may be larger than the accumulated value of the write size accurately measured.

The unified quota management apparatus be included in the virtualizing apparatus by which a plurality of network storage are virtually caused to appear as a single file system.

According to a fourth aspect of the invention, there is provided a storage-system-wide or unified quota setting method (hereinafter called a unified quota setting method) in an environment with a plurality of network storage connected to a network. In this method, the network storage includes a file system having the quota function, a remote quota server, a unified quota information table, a unified quota control unit and a unified quota setting control unit.

The unified quota information table has an identifier, an upper limit value, a threshold value and an accumulated value. The upper limit value is the one of the total disk usage amount set for each user or each user group. The threshold value is a virtual upper limit value determined in accordance with the physical upper limit value and the disk usage amount for each user or each user group. The accumulated value is the one of the write size due to the write request for each user or each user group.

The unified quota control unit includes a comparator for comparing the accumulated value and the threshold value with each other, a unit for updating the accumulated value, a unit for accessing the remote quota server of each network storage subjected to the unified quota management and determining the accurate total disk usage amount for each user or each user group, and a unit for comparing the accurate total disk usage amount with the upper limit value, a unit for changing the threshold value in accordance the accurate total disk usage amount and the upper limit value, and a unit for clearing the accumulated value in the unified quota information table of the network storage subjected to the unified quota management.

The unified quota setting method includes the process executed by the manager including the step of setting the control command, the identifiers of the user and the user group and the upper limit value of the disk usage amount of the user and the user group, and the the process executed by the unified quota setting control unit including the step of receiving the control command, the identifiers of the user and the user group and the upper limit value through the network and setting the identifiers and the upper limit value in the unified quota information table.

In accordance with this upper limit value, the disk usage amount for each user or each user group is limited totally.

The control preferably includes a command for registering the identifiers of the user and the user group and the upper limit value anew in the unified quota information table, a command for changing the contents of the unified quota information able, and a command for validating or invalidating the function of the unified quota management.

According to a fifth aspect of the invention, there is provided a unified quota setting method for a virtualized and unified file system in which a plurality of network storage are caused to appear a single virtual file system.

In this aspect of the invention, the virtualized and unified file system comprises a plurality of network storage having the quota function and the remote quota server, a virtualizing apparatus, a unified quota control unit and a unified quota information table. The unified quota information table includes an identifier, an upper limit value, a threshold value and an accumulated value. The upper limit value is an upper limit value of the total disk usage amount set for each user or each user group. The threshold value is a virtual upper limit value determined in accordance with the upper limit value and the disk usage amount for each user or each user group. The accumulated value holds the accumulated value of the write size due to the write request for each user or each user group.

The unified quota control unit includes a unit for comparing the accumulated value and the threshold value with each other, a unit for updating the accumulated value, a unit for accessing the remote quota server of each network storage subjected to the unified quota management and determining the accurate total disk usage amount for each user or each user group, a unit for comparing the accurate total disk usage amount with the upper limit value, a unit for changing the threshold value in accordance with the accurate total disk usage amount and the upper limit value, and a unit for clearing the accumulated value in the unified quota information table in the network storage subjected to the unified quota management.

Further, the unified quota setting method includes the process executed by the manager including the step of setting a control command, identifiers of the user and the user group and the upper limit of the disk usage amount of the user and the user group for the unified quota setting control unit through the network, and the process executed by the unified quota setting control unit including the step of receiving the control command, the identifiers of the user and the user group and the upper limit value through the network and setting the identifiers and the upper limit value in the unified quota information table, wherein the disk usage amount is controlled totally for each user or each user group in accordance with the upper limit value.

The control command, on the other hand, includes a command for newly registering the identifiers and the upper limit value of the user and the user group in the unified quota information table, a command for changing the contents of the unified quota information table and a command for validating or invalidating the unified quota management function.

As described above, according to this invention, the timing of judging the limit of the disk usage amount is controlled using the accumulated write size of the access request of the user, and thus the number of times the limit of the disk usage amount is judged is reduced.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing the flow of the access request process of a virtualizing unit.

FIG. 3 is a diagram showing the structure of a unified quota information table.

FIG. 6 is diagram showing the flow of the unified quota setting control method according to the first embodiment of the invention.

FIG. 9 is a diagram showing the flow of the unified quota control unit according to the third embodiment of the invention.

DETAILED DESCRIPTION OF THE INVENTION

Figure 1:
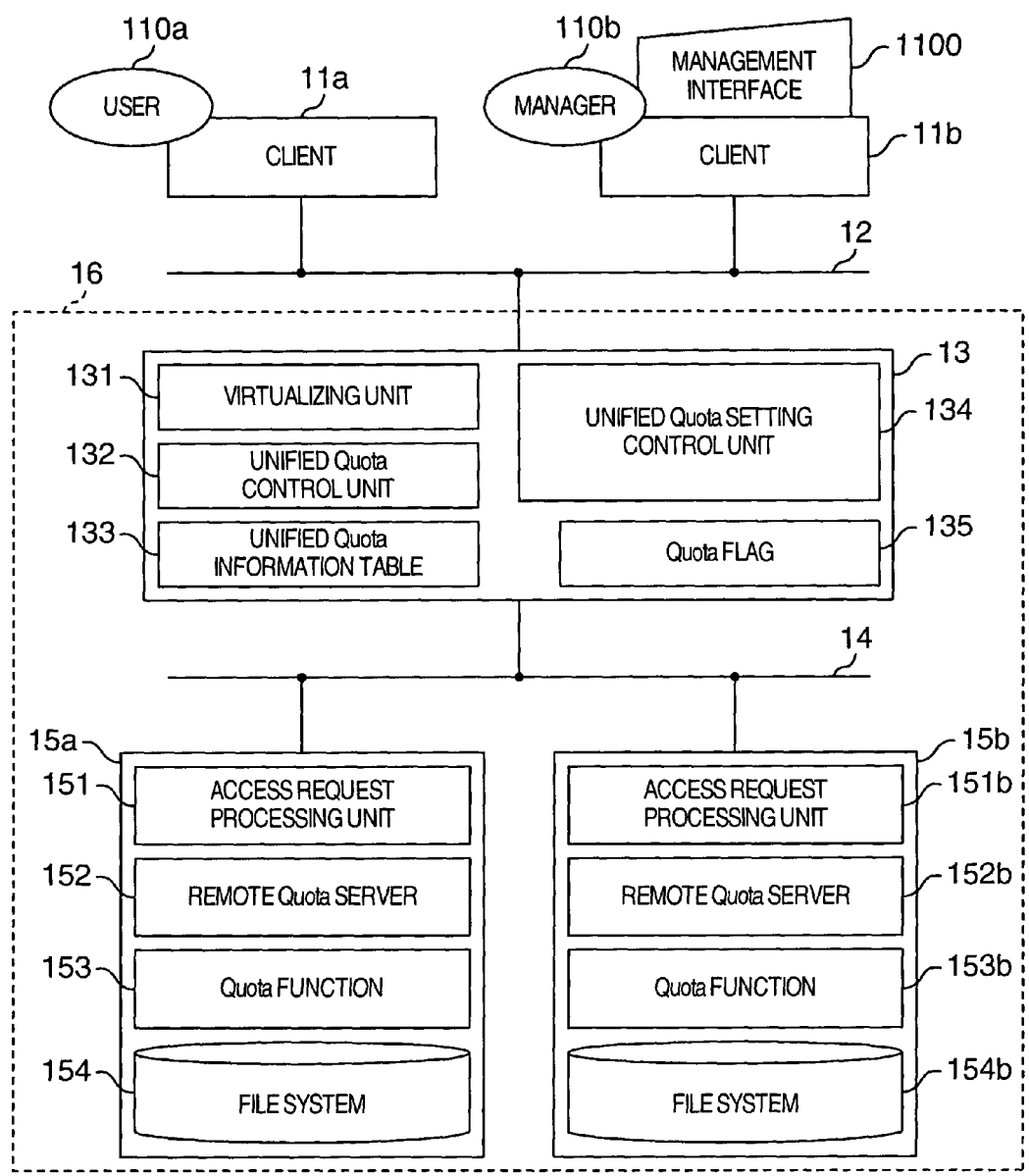
FIG. 1 is a diagram showing a general configuration of an information system according to a first embodiment of the invention.

FIG. 1 is a block diagram showing a general configuration of an information system according to a first embodiment of the invention.

The information system has a plurality clients 11*a*, 11*b* and a virtualized and unified NAS system 16 connected to a network. The virtualized and unified NAS system 16 is configured of a network 14, a virtualizing apparatus 13 and NASs 15*a*, 15*b*. The user 110*a* and the manager 110*b* access the virtualizing apparatus 13 by way of the clients.

Instead of the preparing the network 14, the NASs 15*a*, 15*b* may be connected to the network 12. In the case where the networks 12 and 14 are independent of each other, the network traffic is distributed and the responsiveness between the clients and the virtualizing apparatus is improved. In the case where the network 12 is connected with the NASs 15*a*, 15*b*, on the other hand, the need of the network 14 is eliminated and the cost is reduced.

The NFS (network file system) protocol is used as a means for giving a file access request of the clients through the networks 12, 14. A standard file access protocol other than NFS may be used. Other file access protocols include CIFS (common internet file system), AFP (Apple file protocol) and NCP (netware core protocol).

The NAS 15*a* includes an access request processing unit 151, a remote quota server 152, a quota function 153 and a file system 154.

The access request processing unit 151 receives a request for access to a file or a directory from the users connected to the clients, and reflects the access request in the file system 154. The types of access request include the file creation, read operation, write operation and the directory creation.

The quota function 153 identifies the user and the user group by identifiers and controls the disk usage amount and the upper limit value in the file system 154 of the user and the user group. In the case where the disk usage amount of the user and the user group exceeds the upper limit value due to the access request of the user and the user group, the quota function 153 returns a quota error to the user and the user group without reflecting the access request in the file system. As an alternative, the upper limit value to be controlled is changed in response to a request of the user and the user group for changing the upper limit.

In the case where the manager 110*b* issues a request to the remote quota server 152 to access or change the upper limit value for the user and the user group, the remote quota server 152 gives a response on or changes the upper limit value for the user and the user group which is controlled by the quota function 153 of the file system 154. Also, in the case where the manager 110b requests the remote quota server 152 to access the disk usage amount of the user and the user group from the clients, the remote quota server 152 replies the disk usage amount of the user and the user group managing the quota function 153 to the manager.

The NAS 15b has a similar configuration to the NAS 15a.

In the case where the NFS protocol is used as a means for file access from the clients, the access request processing unit uses the well-known "rpc.mountd" and "rpc.nfsd", and uses "rpc.rquotad" as a remote quota server. The RQUOTA protocol which has no function to limit the disk usage amount is used with the NFS protocol.

The virtualizing apparatus 13 includes a virtualizing unit 131, a unified quota control unit 132, a unified quota information table 133, a unified quota setting control unit 134 and a quota flag 135.

The virtualizing unit 131 causes a plurality of NASs to appear virtually as a single storage system t the clients and accesses the unified quota control unit 132.

The unified quota control unit 132 is accessed by the virtualizing unit 131 to execute the unified quota control of the access requests from the users.

The unified quota information table 133 holds the information used for the unified quota control.

The unified quota setting control unit 134 receives a setting change request from the manager 110b, and changes the setting of the unified quota control.

The quota flag 135 indicates whether the unified quota function is valid or not.

The virtualizing unit 131 performs a series of processing operations (the access request processing of the conventional virtualizing unit). Specifically, the virtualizing unit 131 storage-stystem-widely receives the request to access the file or the directory issued to the virtualized and unified NAS system from the client users, specifies a destination NAS having the file associated with the access request, and transfers the access request to the access request processing unit of the destination NAS.

The virtualizing unit 131 according to this invention, however, accesses the unified quota control unit 132 and after that, issues an access request for the conventional virtualizing unit.

FIG. 2 shows a flowchart for the virtualizing unit 131.

The virtualizing unit 131, upon receipt of an access request from the user, first conducts the inspection (S201) on the quota flag 135 and the inspection (S202) as to whether the access request is a write request or not. In the case where the inspection result shows that the quota flag 135 is off or the access request is not a write request, the same access request processing as in the conventional virtualizing unit (S206, S207) is executed thereby to end the process. In the case where the quota flag 135 is on and the access request is an access request for the write operation (write request), then the unified quota control unit 132 is activated (S203).

In the case where a quota error is detected by the unified quota control unit 132, the virtualizing unit 131 notifies the user of the quota error at the end of the processing. In the case where no quota error is detected, on the other hand, the same access request processing (S206, S207) as in the conventional virtualizing unit is executed and the process ends.

In the case where the NFS protocol is used as a means of access request, the disk usage amount is not greatly increased by other than the requests WRITE, CREATE, SETATTR and MKDIR of all the requests to change the disk in NFS. According to this embodiment, therefore, WRITE, CREATE, SETATTR and MKDIR are handled as write requests for an access to an object subjected to the unified quota control.

The unified quota information table 133 holds the storage-system-wide upper limit value, threshold value and the accumulated value of the user and the user group.

FIG. 3 shows the structure of the unified quota information table 133. Sets of the identifier 301 of the user and the user group, the upper limit value 302, the accumulated value 303 and the threshold value 304 are included in one-to-one correspondence. The user and the user group are identified by identifiers. The correspondence between the user and the user group and the identifiers in the unified quota information table 133 is equivalent to that between the user and the user group and the identifiers for managing the quota function 153 of the NAS 15a.

The upper limit value is that of the total disk usage amount of the NAS subjected to the unified quota management.

The threshold value is a value indicating the timing when the limit of the disk usage amount is to be judged and used with the accumulated value. In the case where the limit of the disk usage amount is judged in the unified quota control unit 132, the threshold value is updated in the unified quota control unit 132.

The accumulated value is an approximate value obtained by accumulating the write size obtained by analysis of the access requests of the user and the user group in the unified quota control unit 132. In the case where the accumulated value exceeds the threshold value, the limit of the disk usage amount is judged. Each time the unified quota control unit 132 is activated, the write size is added to the accumulated value to update the latter. In the case where the limit of the disk usage amount is judged by the unified quota control unit 132, however, the write size is added only after resetting the accumulated value.

The unified quota control unit 132 is activated by the virtualizing unit 131 so that the virtualized and unified NAS system 16 is subjected to the unified quota control operation.

The unified quota control unit 132 is operated in two stages. In the first stage, a case in which the quota error is likely to occur is specified by the use of the write request, the threshold value and the accumulated value. In the second stage, the limit of the disk usage amount is judged only in the case where the quota error is likely to occur. In view of the fact that the process in the first stage uses only the unified quota information table 133 and the access request as information, no extraneous access is generated through the network. The processing in the second stage, on the other hand, requires the acquisition of the information of each NAS and therefore generates an access through the network.

Figure 4:
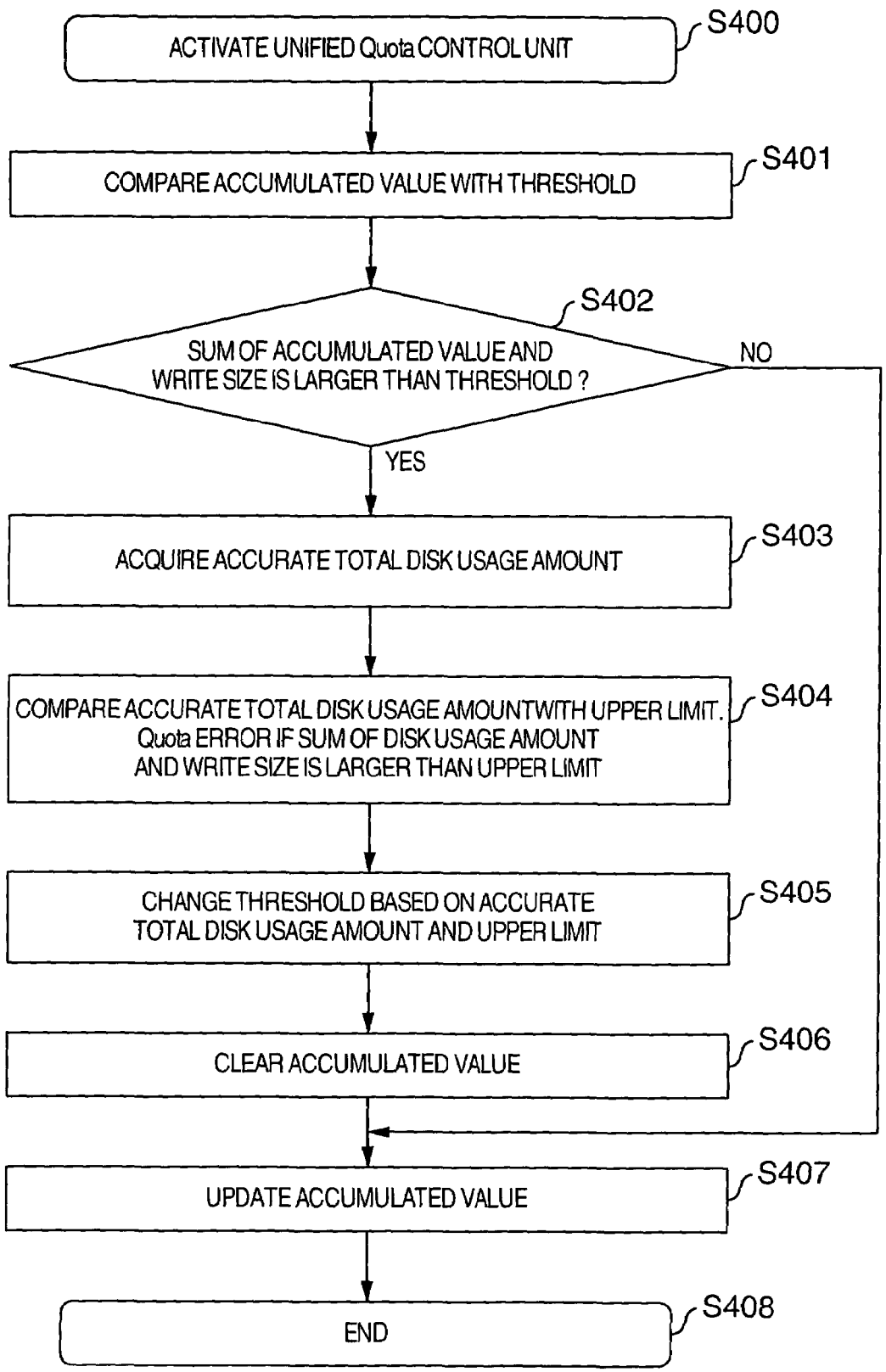
FIG. 4 is a diagram showing the flow of the unified quota control unit according to second and third embodiments of the invention.

FIG. 4 is a flowchart showing the unified quota control unit 132.

The unified quota control unit 132 performs the operation including the step of comparing the accumulated value with the threshold value in the unified quota information table 133 (S401), the step of acquiring an accurate total disk usage amount (S403), the step of comparing the accurate disk usage amount with the upper limit value (S404), the step of changing the threshold value based on the accurate total disk usage amount and the upper limit value (S405), the step of clearing the accumulated value (S406) and the step of updating the accumulated value (S407).

The unified quota control unit 132 determines whether a quota error is likely to occur, by use of the write request and the threshold value and the accumulated value in the unified quota information table 133 (S401), and in the case where the quota error never occurs, updates the accumulated value (S407) thereby to end the process.

In the case where a quota error is likely to occur, on the other hand, a series of the process (judgment of the limit of the disk usage amount) are executed including the step of acquiring the accurate total disk usage amount (S403) and the step of comparing the accurate total disk usage amount with the upper limit value (S404). In the case where a quota error is detected in the step (S404) of comparing the accurate total disk usage amount with the upper limit value, the unified quota control unit 132 notifies the quota error to the virtualizing unit 131 when returning to the virtualizing unit 131 at the end of the process.

After judging the limit of the disk usage amount, the unified quota control unit 132 updates the threshold value (S405) regardless of whether a quota error has been detected or not, and proceeds to the step (S406) for clearing the accumulated value. After that, the accumulated value is updated (S407) thereby to end the process.

Instead of executing the step (S405) for changing the threshold value based on the accurate total disk usage amount and the upper limit value, a predetermined constant may be used continuously as a threshold value.

(Step of Comparing Accumulated Value with Threshold)

This step is to determine whether a quota error can occur or not (whether the judgment of the limit of the disk usage amount is required or not).

First in this step, the write size due to the write request is specified. Next, the sum of the write size and the accumulated value of the write size due to the write request of the user and the user group held in the unified quota information table 133 is compared with the threshold value. In the case where the sum of the accumulated value and the write size is not more than the threshold value, the step of updating the accumulated value is executed (S407). In the case where the sum of the accumulated value and the write size exceeds the threshold value, on the other hand, the step of acquiring an accurate total disk usage amount (S403) is executed.

The write size due to the write request is a value acquired by analysis of the write request and larger than the actual increase in the disk usage amount due to the write request.

In the case where the NFS protocol is used as a means for access request, for example, the data size written in the file is used as a write size for WRITE, the file size for a new file attribute as a write size for CREATE and SETATTR, and the size of the produced directory size as a write size for MKDIR.

(Step of Acquiring Accurate Total Disk Usage Amount)

This step is executed only in the case where a quota error is likely to occur, in which case the remote quota server of the NAS subjected to the unified quota management is accessed thereby to acquire the sum of the accurate disk usage amount of the users and the user groups (accurate total disk usage amount) for the NAS subjected to the unified quota management.

First in this step, the remote quota servers 152, 152b of the NASs 15a, 15b subjected to the unified quota management are accessed, thereby acquiring the disk usage amount of the user and the user group held by the quota functions 153, 153b of the file system of the NASs 15a, 15b. The total sum of the disk usage amounts acquired for the NASs is calculated and used as an accurate total disk usage amount.

(Step of Comparing Accurate Total Disk Usage Amount with Upper Limit)

This step is to determine whether a unified quota error exists or not.

For this determination, the sum of the accurate total disk usage amount acquired in the preceding step (S404) and the write size of the write request is compared with the upper limit value held in the unified quota information table 133. In the case where the sum of the accurate total disk usage amount and the write size exceeds the upper limit value, a quota error is judged, and the unified quota control unit 132 returns the quota error at the end of the operation thereof. Otherwise, nothing is returned.

Regardless of whether a quota error is detected or not, the unified quota control unit 132 executes the step of changing the threshold value based on the upper limit value and the accurate total disk usage amount (S405) and the step of clearing the threshold value (S406).

(Step of Changing Threshold Based on Accurate Total Disk Usage Amount and Upper Limit)

In this step, the difference between the upper limit value and the accurate total disk usage amount acquired in the preceding step (S403) is set as a threshold for the user and the user group in the unified quota information table 133.

By setting the threshold not as a fixed value but as a value variable with the prevailing situation, the accuracy of quota determination is improved. In the case where the disk usage amount of the user and the user group is small, for example, a large threshold value is set. In this way, the network traffic for acquiring the accurate total disk usage amount is reduced. With the approach of the disk usage amount of the user and the user group to the upper limit value, the threshold level is set smaller and the accurate unified disk usage amount is frequently acquired, thereby improving the unified quota accuracy.

(Step of Clearing Accumulated Value)

This step is executed for changing the accumulated value of the user and the user group in the unified quota information table 133 to zero after the step (S405) for changing the threshold value based on the accurate unified disk usage amount.

(Step of Updating Accumulated Value)

In this step, the accumulated value of the user and the user group in the unified quota information table 133 is updated. The value of the write size specified in the preceding step (S401) is added to the accumulated value.

The unified quota setting control unit 134 is activated in response to an instruction of the manager 110b on client side to change the quota setting by the management interface 1100 such as Web, thereby changing the quota flag 135 and the information of the unified quota information table 133. The management interface 1100 may be CUI or GUI as shown in FIG. 5.

Figure 5:
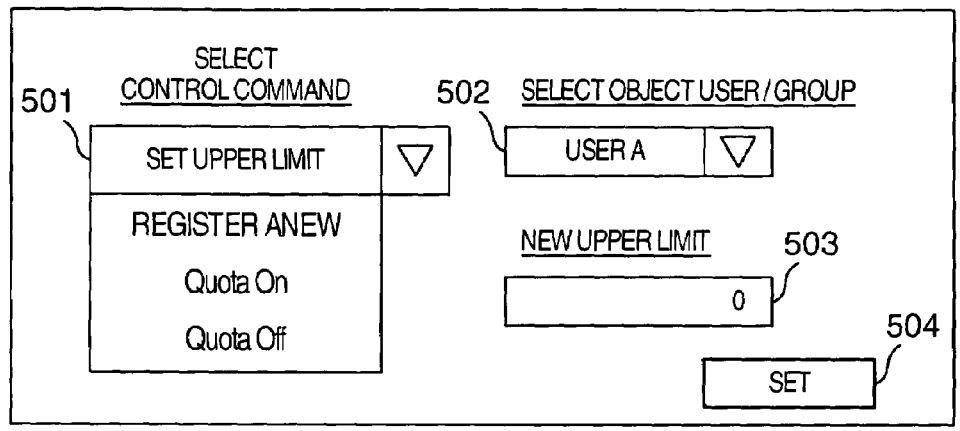
FIG. 5 is a diagram showing a management interface.

In the management interface 1100 shown in FIG. 5, the manager 110b selects the control command by a control command select tab 501, selects the user and the user group by an object user/group select tab 502, inputs the size of the new upper limit value in a new upper limit input form 503 and depresses the setting button 504. Then, the control command, the identifiers of the user and the user group, and the information on the size of the new upper limit value are sent to the unified quota setting control unit.

FIG. 6 is a flowchart showing the unified quota setting control method for changing the quota setting using the unified quota setting control unit 134.

The manager 110b gives an instruction to change the quota setting through the management interface 1100 (S601). Then, the three information including the control command, the identifiers of the user and the user group and the new upper limit value designated by the manager 110b are sent to the unified quota setting control unit through the network (S602).

The unified quota setting control unit 134 executes the process corresponding to the control command received (S603).

In the case where the control command indicates the change of the upper limit value of the disk usage amount of the user and the user group, the upper limit value of the user and the user group in the unified quota information table 133 is changed to the size of the new upper limit value designated by the manager (S604).

In the case where the control command indicates the validation of the unified quota function, the quota flag 135 is set to on state (S605).

In the case where the control command indicates the invalidation of the unified quota function, on the other hand, the quota flag 135 is set to off state (S606).

In the case where the control command indicates the new setting of the upper limit of the disk usage amount of the user and the user group, the identifiers of the user and the user group are registered in the unified quota information table 133 thereby to set the upper limit value of the disk usage amount of the user and the use group received with the command (S607).

After executing steps S604, S607, the accumulated value and the threshold value of the user and the user group in the unified quota information table 133 are newly set. After executing step S605, on the other hand, all the accumulated values and the threshold values of the user and the user group in the unified quota information table 133 are newly set (S608).

In one method of setting the accumulated value and the threshold value of the user and the user group, the accumulated value and the threshold value of the user and the user group in the unified quota information table 133 are set to zero. As a result, in the next process execution by the unified quota control unit 132, the step of changing the threshold value based on the accurate total disk usage amount and the upper limit value (S405) and the step of clearing the accumulated value (S406) are executed thereby to reset the accumulated value and the threshold value. In the case where the process of steps S604, S607 is executed, however, a desired value can be set as a threshold value of the user and the user group not more than the upper limit value.

By changing the contents of the unified quota information table 133 and the quota flag 135 in the above-described manner, the unified quota control operation can be performed based on the quota set by the manager.

The management interface 1100 receives a request to change the quota set by the manager 110b on the part of the clients.

The management interface 1100 may be either CUI or GUI shown in FIG. 5. In the interface 1100 shown in FIG. 5, the manager selects the control command by the control command select tab 501, selects the user and the user group by the object user/group select tab 502, inputs the size of the new upper limit value by the new upper limit value input form 503, and the depresses the setting button 504. Then, the control command, the identifiers of the user and the user group and the size information of the new upper limit value are sent to the unified quota setting control unit.

(Operation of Unified Quota Function in Response to Request of Manager and User)

The operation of the unified quota setting control unit 134 and the virtualizing unit 131 are described below with reference to the case where the client of the user 110a and the manager 110b issues requests continuously to the virtualized and unified NAS system 16 in the following manner:

1. The manager 110b issues a request to set the upper limit value of the user 110a to 20.
2. The user 110a issues a WRITE request of size 8 to the file A stored in the NAS 15a.
3. The user 110a issues a WRITE request of size 8 to the file B stored in the NAS 15a.
4. The user 110a issues a WRITE request of size 8 to the file C stored in the NAS 15b.

Once the quota function is actuated correctly, a quota error is determined against the WRITE request of write size 8 to the file C of the NAS 15b from the user 110a.

In the initial stages, assume that the quota flag 135 is in on state and the unified quota function is validated so that no disk is used by the user 110a in the virtualized and unified NAS system 16. The operation against each request is described below.

1. The manager 110b issues a request to set the upper limit value of the user 110a at 20.

In the management interface 1100 shown in FIG. 5, the manager 110b selects "change upper limit" at the control command select tab 501, selects the user 110a at the object user/group select tab 502, inputs 20 in the new upper limit input form 503, depresses the setting button 504 and thereby issues a request to set the upper limit of the user 110a at 20 (S601). Then, the same request is sent to the unified quota setting control unit 134 (S602).

The unified quota setting control unit 134 changes the upper limit value of the user 110a in the unified quota information table 133 to 20, the threshold value to 0 and the accumulated value to 0 (S604), thus ending the process.

2. The user 110a issues a WRITE request of size 8 to the file A stored in the NAS 15a.

The virtualizing unit 131 receives the WRITE request, and executes the operation of the unified quota control unit 132 (S203).

The unified quota control unit 132 specifies the write size as 8 and compares it (S401), and decides to judge the limit of the disk usage amount (S403, S404). Unified quota control unit 132 specifies the accurate total disk disk usage amount of the user 110a at 0 (S403), and determines that the WRITE requests constitutes no quota error (S404). After that, the unified quota control unit 132 sets the threshold value of the user 110a to 20 in the unified quota information table 133 (S405), sets the accumulated value to 0 (S406) and then to 8 (S407), thereby ending the process.

After that, the virtualizing unit 131 transfers the WRITE request to the NAS 15a by the conventional virtualizing and unifying process (S206, S207), thereby ending the process.

3. The user 110a issues a WRITE request of size 8 to the file B stored in the NAS 15a.

The virtualizing unit 131 receives the WRITE request, and executes the operation of the unified quota control unit 132 (S203).

The unified quota control unit 132 specifies the write size at 8 and makes comparison (S401), determines that no quota error is involved without judging the limit of the disk usage amount (S403, S404), and changes the accumulated value of the user 110a in the unified quota information table 133 to 16 (S407), thereby ending the process.

After that, the virtualizing unit 131 transfers the WRITE request to the NAS 15a by the conventional virtualizing and unifying process (S206, S207), thereby ending the process.

4. The user 110a issues a WRITE request of size 8 to the file C stored in the NAS 15b.

The virtualizing unit 131 receives the WRITE request, and executes the process of the unified quota control unit 132 (S203).

The unified quota control unit 132 specifies the write size as 8 and makes comparison (S401), and decides to define the limit of disk usage amount (S403, S404). The unified quota control unit 132 specifies the accurate total disk usage amount of the user 110a as 16 (S403), and determines that a quota error is caused by the WRITE request (S404). After that, the unified quota control unit 132 sets the threshold hold value of the user 110a in the unified quota information table 133 at 4 (S405), and the accumulated value of the user 110a in the unified quota information table 133 at 8 (S407), after which the quota error is returned to the virtualizing unit 131 to end the process.

The virtualizing unit 131, upon receipt of the quota error from the quota control unit 132, returns the quota error to the user 110a, thereby ending the process.

[Embodiment 2]

Figure 7:
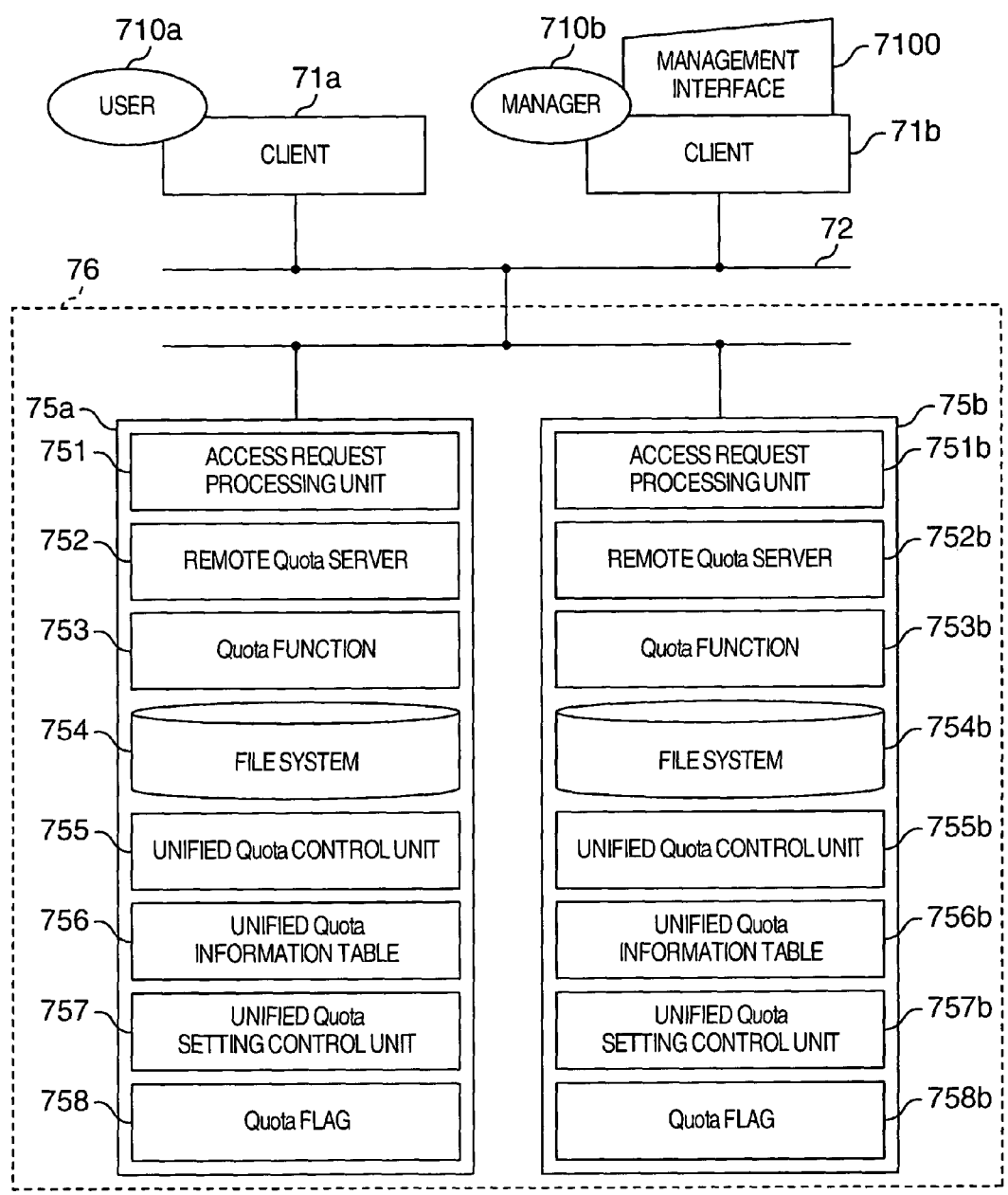
FIG. 7 is a diagram showing a general configuration of an information system according to the second and third embodiments.

FIG. 7 is a diagram showing a general configuration of an information system according to a second embodiment of the invention. Clients 71a, 71b and a plurality of NAS environments 76 are connected to a network. A plurality of the NAS environments 76 are configured of a network 72 and NASs 75a, 75b having the unified quota function. According to this embodiment, the fact that each NAS has unified control units 755, 755b realizes the unified quota control in the plurality of the NAS environments 76.

(NAS Having Unified Quota Function)

The NAS 75 in this embodiment is configured of an access request processing unit 751, a remote quota server 752, a quota function 753, a file system 754, a unified quota control unit 755, a unified quota information table 756, a unified quota setting control unit 757 and a quota flag 758.

The remote quota server 752, the quota function 753, the file system 754 and the unified quota information table 756 correspond to the remote quota server 152, the quota function 153, the file system 154 and the unified quota information table 133, respectively, in the first embodiment. The threshold value and the accumulated value in the unified quota information table 756 are values unique to the NAS 75a, and the upper limit values thereof are shared by the NASs.

The NAS 75b has a similar structure to the NAS 75.

The unified quota control units 755, 755b exist in each NAS for performing the unified quota control operation in an environment 76 involving a plurality of NASs.

One or a plurality of the unified quota setting control units 757 existing in an environment involving a plurality of NASs receive a setting change request from the manager 710b and change the setting in the unified quota control.

The quota flag indicates whether the unified quota function is valid or not, and the quota flags 758, 758b of each NAS constituting the object of the unified quota management assume values synchronized with each each other.

(Access Request Processing Unit)

The access request processing unit 751 reflects the access request from the user of the clients in the file system (conventional access request process).

Figure 8:
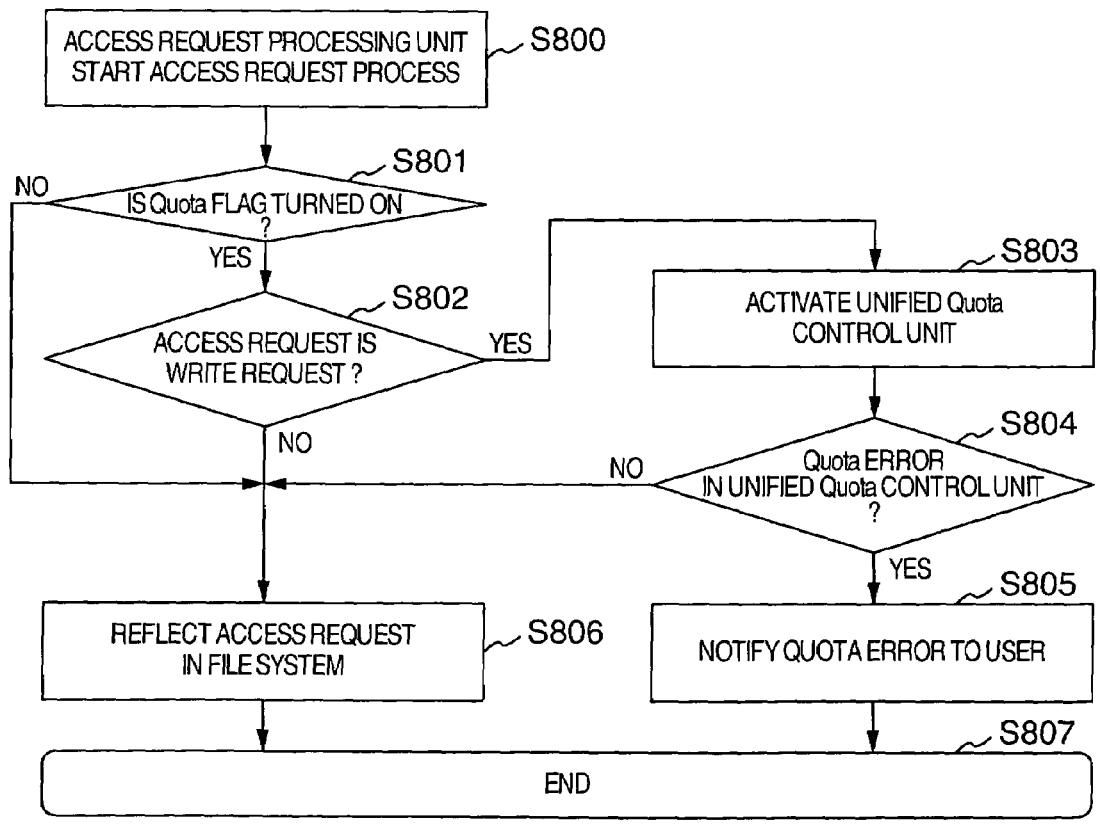
FIG. 8 is a diagram showing the flow of the access request process of the access request processing unit.

The access request processing unit 751 according to the invention activates the unified quota control unit 755 and subsequently executes the conventional access request process. FIG. 8 shows a flowchart of the access request processing unit 751.

The access request processing unit 751, upon receipt of an access request from the user 710a, first inspects the quota flag 758 (S801), and if it is off, executes the conventional access request process (S806) to end the process. Next, the access request processing unit 751 checks the access request (S802), and in the case where the access request is not related to the write operation (write request), executes the conventional access request process (S806) thereby to end the process. In the case where the access request is a write request, on the other hand, the unified quota control unit 755 is activated (S803).

In the case where a quota error is detected in the unified quota control unit 755 (S804), the access request processing unit 751 notifies the user 10a of a quota error (S805) thereby to end the process. Unless a quota error is detected, on the other hand, the access request processing unit 751 executes the conventional access request process (S806) thereby to end the process.

(Unified Quota Control Unit)

The unified quota control unit 755 performs the unified quota control operation on an environment 76 involving a plurality of NASs.

The process executed by the unified quota control unit 755 is similar to that executed by the unified quota control unit 132 in the first embodiment. The unified quota control unit 755 executes the process in two stages including the stage for specifying a case in which a quota error may occur and the stage for judging the limit of the disk usage amount. FIG. 4 is a flowchart for the unified quota control unit 755.

The unified quota control unit 755 executes the process including the step of comparing the accumulated value with the threshold value held in the unified quota information table 756 (S401), the step of acquiring an accurate total disk usage amount (S403), the step of comparing the accurate total disk usage amount with the upper limit value (S404), the step of changing the threshold value based on the accurate total disk usage amount and the upper limit value (S405), the step of clearing the accumulated value (S406) and the step of updating the accumulated value (S407).

The difference between the unified quota control unit 755 and the unified quota control unit 132 lies in the manner in which the values (accumulated value, threshold value) in the unified quota information table are handled in each step. Specifically, according to this embodiment, the accumulated value and the threshold value are managed individually in each NAS. In the step of changing the threshold value based on accurate total disk usage amount and the upper limit value (S405) and the step of clearing the accumulated value (S406), the accumulated values and the threshold values held in the unified quota information table of all the NASs subjected to the unified quota management are changed. In the step (S407) for updating the accumulated value, on the other hand, only the accumulated value held in the unified quota information table of the NAS which executes the step (S407) for updating the accumulated value is updated.

(Step of Comparing Accumulated Value with Threshold Value)

This step is to check whether a quota error can occur or not (whether the limit of the disk usage amount is required to be judged or not).

First in this step, the write size due to the write request is specified. Next, the sum of the accumulated value of the write size due to the write request of the user and the user group held in the unified quota information table 756 and the write size is compared with the threshold value. In the case where the sum of the accumulated value and the write size is not more than the threshold value, the step of updating the accumulated value (S407) is executed, and the process of the unified quota control unit 755 is ended. In the case where the sum of the accumulated value and the write size exceeds the threshold value, on the other hand, the step of acquiring an accurate total disk usage amount (S403) is executed.

(Step of Changing Threshold Based on Accurate Total Disk Usage Amount and Upper Limit)

First in this step, the difference between the upper limit value of the user and the user group and the accurate total disk usage amount acquired in the preceding step (S403) is determined. Next, this difference is distributively set as the threshold values of the user and the user group in the unified quota information tables 756, 756b of each NAS subjected to the unified quota management. This difference may alternatively be distributed equally or unequally among the NASs. Also, the distributed values may take any value lower than the difference.

(Step of Clearing Accumulated Value)

In this step, the accumulated value of the user and the user group in the unified quota information tables 756, 756b of each NAS subjected to the unified quota management is reset to 0.

(Step of Updating Accumulated Value)

In this step, the accumulated value is updated.

The value of the write size specified in the preceding step (S404) is added to the accumulated value of the user and the user group in the unified quota information table 756 thereby to update the accumulated value.

(Unified Quota Setting Control Unit)

The unified quota setting control unit 757 is operated in the case where the manager 710b on the client side issues a request to change or newly register the quota setting of the user and the user group by way of the management interface 7100 such as Web, and thus changes the unified quota information tables 756, 756b and the quota flags 758, 758b.

Figure 10:
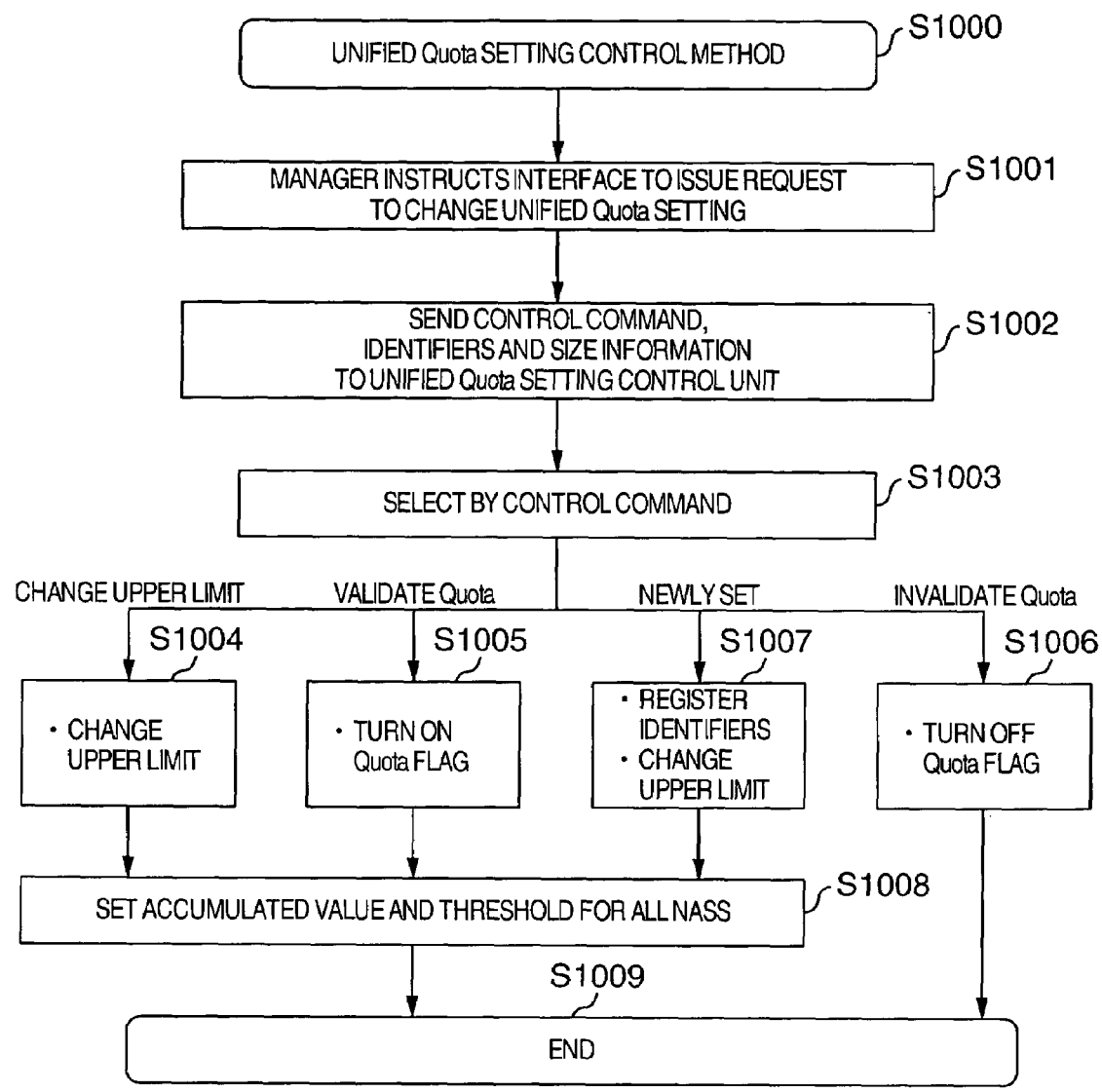
FIG. 10 is a diagram showing the flow of the unified quota setting control method according to the first and third embodiments of the invention.

FIG. 10 is a flowchart for the unified quota setting control method for changing the quota setting using the unified quota setting control unit 757.

The manager 710b gives a request to change the quota setting through the management interface 7100 (S1001). Then, the three information including the control command, the identifiers of the user and the use group and the size of the new upper limit value are sent to the unified quota setting control unit 757 through the network (S1002).

The unified quota setting control unit 757 executes the process corresponding to the control command received (S1003).

In the case where the control command indicates the change of the upper limit value of the disk usage amount of the user and the user group, the upper limit value of the user and the user group in the unified quota information tables 756, 756b of each NAS to be subjected to unified quota management are changed (S1004).

In the case where the control command indicates the validation of the unified quota function, on the other hand, the quota flags 758, 758b of each NAS subjected to the unified quota management are turned on thereby to validate the unified quota function (S1005).

In the case where the control command indicates the invalidation of the unified quota function, the quota flags 758, 758b of each NAS subjected to the unified quota management are set to off state (S1006).

In the case where the control command indicates the new setting of the upper limit of the disk usage amount of the user and the user group, the identifiers of the user and the user group are registered in the unified quota information tables 756, 756b thereby to set the upper limit value of the disk usage amount of the user and the user group received with the command (S1007).

After executing steps S1004 and S1007, the accumulated value and the threshold value of the user and the user group of all the NASs subjected to the unified quota management are newly set. After executing step 1005, on the other hand, all the accumulated values and the threshold values of the user and the user group subjected to the unified quota management are newly set (S1008).

In a method of resetting the accumulated value and the threshold value of the user and the user group of all the NASs subjected to the unified quota management, the accumulated value and the threshold value of the user and the user group of all the NASs subjected to the unified quota management are set to 0. As a result, the accumulated value and the threshold value are reset at the time of executing the next process in the unified quota control unit of each NAS. In the case where steps S1004 and S1007 are executed, however, the threshold value of each NAS may be set to more than zero as long as the sum of the threshold values of each NASs subjected to the unified quota management is not more than the upper limit value.

By changing the process in the way described above, the unified quota control operation is performed based on the quota set by the manager.

(Operation of Unified Quota Function in Response to Request of Manager and User)

According to this embodiment, an explanation will be given about the operation of the quota function performed in the case where requests are issued continuously by the user 710a or the manager 711a as shown below to a plurality of NAS environments 76.

1. The manager 711a issues a request to set the upper limit value of the user 710a to 20.
2. The user 710a issues a WRITE request of write size 8 to the file A of the NAS 75a.
3. The user 710a issues a WRITE request of write size 8 to the file B of the NAS 75b.
4. The user 710a issues a WRITE request of write size 8 to the file C of the NAS 75a.

Once the quota function operates correctly, the WRITE request of write size 8 issued to the file C of the NAS 75a of the user 710a is judged as a quota error.

In the initial stage, assume that the quota flags 758, 758b are both on, the unified quota function is valid and the user 710a does not use the disk at all in an environment involving a plurality of NASs 76. The operation of the elements of the environment 76 involving a plurality of NASs in response to each request is described below.

1. The manager 711a issues a request to set the upper limit value of the user 710a to size 20.

In the management interface 7100 shown in FIG. 5, the manager 711a selects "change upper limit" in the control command select tab 501, selects the user 710a in the object user/group select tab 502, inputs 20 in the new upper limit value input form 503, depresses the setting button 504 thereby to issue a request to set the upper limit of the user 710a to 20 (S1001). The request is sent to the unified quota setting control unit 757 (S1002).

The unified quota setting control unit 757 changes the upper limit value of the user 10a in the unified quota information tables 756, 756b to 20 (S1004), and the threshold value and the accumulated value of the user 10a in the unified quota information table 756, 756b to 0 (S1008) thereby to end the process.

2. The user 710a issues a WRITE request of the write size 8 to the file A of the NAS 75a.

The access request processing unit 751 receives the WRITE request, and activates the unified quota control unit 755 (S803).

The unified quota control unit 755 first specifies the write size as 8 and makes comparison (S401), and to decides to judges the limit of the disk usage amount (S403, S404). In judging the limit of the disk usage amount, an accurate total disk usage amount of the user 710a is specified as 0 (S403), and decides that the WRITE request leads to no quota error (S404). After that, the unified quota control unit 755 sets the threshold value of the user 710a in the unified quota information tables 756, 756b to 10 (S405), the accumulated value of the user 710a in the unified quota information tables 756, 756b to 0 (S406), and updates the accumulated value of the user 710a in the unified quota information table 756 to 8 (S407), thereby ending the process.

After that, the access request processing unit 751 reflects the WRITE request in the file system 754 (S806) thereby to end the process.

3. The user 710a issues a WRITE request of write size 8 to the file B of the NAS 75b.

The access request processing unit 751b receives the WRITE request, and activates the unified quota control unit 755b (S803).

The unified quota control unit 756b, which specifies the write size as 8 and makes comparison (S401), decides that no quota error has occurred without judging the limit of the disk usage amount (S403, S404). Then, the unified quota control unit 755b changes the accumulated value of the user 710a to 8 in the unified quota information table 756b (S407) thereby to end the process.

After that, the access request processing unit 751b reflects the WRITE request in the file system 754b (S806) thereby to end the process.

4. The user 710a issues a WRITE request of write size 8 to the file C of the NAS 75a.

The access request processing unit 751 receives the WRITE request, and activates the unified quota control unit 752 (S803).

The unified quota control unit 752, which first specifies the write size as 8 and makes comparison (S401), decides to judge the limit of the disk usage amount (S403, S404). In judging the limit of the disk usage amount, an accurate total disk usage amount of the user 710a is specified as 16 (S403), and it is determined that the WRITE request causes a quota error (S404). After that, the unified quota control unit 752 sets the threshold value of the user 710a at 2 in the unified quota information tables 756, 756b, sets the accumulated value of the user 710a in the unified quota information table 756b to 0 (S406), sets the accumulated value of the user 710a in the unified quota information table 756 to 8 (S407), and returns the quota error to the access request processing unit 751 thereby to end the process.

The access request processing unit 751, upon receipt of the quota error from the unified quota control unit 752, returns the quota error to the user 710a thereby to end the process.

[Embodiment 3]

FIG. 7 is a diagram showing a general configuration of an information system according to a third embodiment of the invention.

This embodiment is a modification of the second embodiment, and as compared with the second embodiment, has a different method of judging the limit of the disk usage amount. According to the second embodiment, the limit of the disk usage amount is judged by the unified quota control units 755, 755b before reflecting the access request in the file systems 754, 754b of each NAS. According to the third embodiment, on the other hand, the quota functions 753, 753b of the file system of each NAS judge the limit of the disk usage amount at the time of reflecting the access request in the file systems 754, 754b of each NAS, and the unified quota control units 755, 755b makes preparation therefor.

As compared with the second embodiment, the third embodiment has the advantage that the process of determining the quota is executed in a stricter fashion. This is due to the fact that the step of comparing the accurate total disk usage amount with the upper limit value (S404) in the second embodiment fails to employ an accurate value of write size for comparison.

Only the difference from the second embodiment, i.e. the unified quota control unit 755 and the access request processing unit 751 will be explained.

(Unified Quota Control Unit)

FIG. 9 is a flowchart for the unified quota control unit 755.

The unified quota control unit 755 executes the process including the step of comparing the accumulated value with a threshold value (S901), the step of acquiring an accurate total disk usage amount (S903), the synchronizing step for causing the file system to determine a unified quota (S904), the step of changing the threshold value based on the accurate total disk usage amount and the upper limit value (S905), the step of clearing the accumulated value (S906), and the step of updating the accumulated value (S907).

The step of comparing the accumulated value with the threshold value (S901), the step of acquiring an accurate total disk usage amount (S903), the step of changing the threshold value based on the accurate total disk usage amount and the upper limit value (S905), the step of clearing the accumulated value (S906), and the step of updating the accumulated value (S907) are equivalent to the step of comparing the accumulated value with the threshold value (S401), the step of acquiring an accurate total disk usage amount (S403), the step of changing the threshold value based on the accurate total disk usage amount and the upper limit value (S405), the step of clearing the accumulated value (S406), and the step of updating the accumulated value (S407), respectively, in the second embodiment.

(Synchronizing Step for Causing the File System to Determine Unified Quota)

In this step, the quota function 753 of the file system 754 makes preparations for determining whether there exists a unified quota error or not (judges the limit of the disk usage amount).

In this step, the upper limit value of the disk usage amount of the user and the user group managed by the quota function 753 of the file system 754 is changed to permit the quota function 753 of the file system 754 to judge the limit of the disk usage amount. The upper limit value of the disk usage amount of the user and the user group managed by the quota function is changed in such a manner that the total residual disk capacity of the user and the user group (the difference between the upper limit value and the accurate total disk usage amount) in an environments 76 involving a plurality of NASs becomes equal to the residual disk capacity of the user and the user group in the file system 754 (the difference between the disk usage amount and the upper limit value managed by the quota function 753 of the file system 754).

In the case where there exists a unified quota error, the quota function 753 of the file system 754 returns the quota error at the time of reflecting the access request in the file system 754 (S806).

Once this step is executed, the setting of the upper limit value of the disk usage amount of the user and the user group managed by the quota function 753 of the file system 754 is invalidated, though not always, at the end of the operation of the access request processing unit (S807).

In the case where the limit of the disk usage amount is judged not by the unified quota control unit 755 but by the quota function 753 of the file system 754, a more strict judgment is possible. This is by reason of the fact that the step of comparing the accurate total disk usage amount with the upper limit value (S404) fails to use an accurate value of the write size for comparison. (Access request processing unit)

In the case where the file system in the unified quota control unit 755 executes the synchronizing step (S904) for determining the unified quota, the access request processing unit 71 invalidates, though not always, the setting of the upper limit value of the disk usage amount of the user and the user group managed by the quota function 753 of the file system 754 at the end of the operation of the access request processing unit 751 (S807).

Also, in the case where the quota function 753 of the file system 754 determines a quota error at the time of reflecting the access request in the file system 754 (S806), the access request processing unit 751 returns the quota error to the user thereby to end the process.

(Operation of Unified Quota Function in Response to Request of Manager and User)

The operation of the quota function according to this embodiment will be described below in the case where the user 710a or the manager 711a issue requests continuously to an environment involving a plurality of NASs in the manner described below.

1. The manager 711a issues a request to set the upper limit value of the user 710a to 20.
2. The user 710a issues a WRITE request of write size 8 to the file A of the NAS 75a.
3. The user 710a issues a WRITE request of write size 8 to the file B of the NAS 75b.
4. The user 710a issues a WRITE request of write size 8 to the file C of the NAS 75a.

Once the quota function operates correctly, the WRITE request of write size 8 issued to the file C of the NAS 75a of the use 710a is determined as a quota error.

In the initial stage, assume that the quota flags 758, 758b are both on, the unified quota function is valid and the user 710a does not use the disk at all in the environment 76 involving a plurality of NASs. The operation of the elements in the environment 76 involving a plurality of the NASs in response to each request is described below.

1. The manager 711a issues a request to set the upper limit value of the user 710a to size 20.

Once the manager 711a issues a request to set the upper limit value of the user 710a to size 10 (S1001), the request is sent to the unified quota setting control unit 757 (S1002).

The unified quota setting control unit 757 changes the upper limit value of the user 10a in the unified quota information tables 756, 756b to 20 (S1004), and changes the threshold value and the accumulated value of the user 10a in the unified quota information tables 756, 756b to 0 (S1008) thereby to end the process.

2. The user 710a issues a WRITE request of write size 8 to the file A of the NAS 75a.

The access request processing unit 751 receives the WRITE request and activates the unified quota control unit 755 (S803).

The unified quota control unit 755, which first specifies the write size as 8 and makes comparison (S901), decides to judge the limit of the disk usage amount (S903, S904). In judging the limit of the disk usage amount, the accurate total disk usage amount of the user 710a is specified as 0 (S903), and the upper limit value of the user 710a managed by the quota function 753 of the file system 754 is changed to 20 (S904). After that, the unified quota control unit 755 sets the threshold value of the user 710a in the unified quota information tables 756, 756b to 10 (S905), sets the accumulated value of the user 710a in the unified quota information table 756b to 0 (S906), and sets the accumulated value of the user 710a in the unified quota information table 756 to 8 (S907) thereby to end the process.

After that, the access request processing unit 751 reflects the WRITE request in the file system 754 (S806), and cancels the upper limit value of the user 710a managed by the quota function 753 of the file system 754 thereby to end the process.

3. The user 710a issues a WRITE request of write size 8 to the file B of the NAS 75b.

The access request processing unit 751b receives the WRITE request, and activates the unified quota control unit 755b (S803).

The unified quota control unit 755b, which specifies the write size as 8 and makes comparison (S901), determines that no quota error occurs without judging the limit of the disk usage amount (S903, S904), and changes the accumulated value of the user 710a in the unified quota information table 756b to 8 (S907) thereby to end the process.

After that, the access request processing unit 751b reflects the WRITE request in the file system 754b (S806) thereby to end the process.

4. The user 710a issues a WRITE request of write size 8 to the file C of the NAS 75a.

The access request processing unit 751 receives the WRITE request, and activates the unified quota control unit 752 (S803).

The unified quota control unit 752, which first specifies the write size as 8 and makes comparison (S901), decides to judge the limit of the disk usage amount (S903, S904). In judging the limit of the disk usage amount, an accurate total disk usage amount of the user 710a is specified as 16 (S903), and the upper limit value of the user 710a managed by the quota function 753 of the file system 754 is changed to 12 (S904). After that, the unified quota control unit 752 sets the threshold value of the user 710a in the unified quota information tables 756, 756b to −2 (S905), sets the accumulated value of the user 710a in the unified quota information table 756b to 0 (S906), sets the accumulated value of the user 710a in the unified quota information table 710a to 8 (S907) and returns the quota error to the access request processing unit 751 thereby to end the process.

After that, the access request processing unit 751 reflects the WRITE request in the file system 754 (S806), and upon receipt of the quota error from the quota function 753, cancels the upper limit value of the user 710a managed by the quota function 753 of the file system 754, and returns the quota error to the user 710*a* thereby to end the process.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for managing an amount of disk usage by an user in a system including a plurality of network storages which provide users with respective disk spaces, the method comprising the steps of:
   registering a disk quota to said user, said disk quota indicates an upper limit of a total disk usage of said user in said system;
   at a timing of judging a limit of disk usage based on measurements, measuring disk usage of said user in each of said network storages, subtracting the measured disk usages from the registered disk quota and registering the remainder as a threshold value indicating an amount of disc space remaining for said user; and
   each time when a write request is issued from said user, accumulating write size estimated from each of write requests which have been issued from said user after said timing of judging a limit of disk usage, and checking whether the accumulated write size exceeds the registered threshold value or not,
   wherein, if the accumulated write size does not exceed the registered threshold value, allowing a latest write request from said user to be executed, and
   wherein, if the accumulated write size exceeds the threshold value, a next-time judging of a limit of disk usage based on measurements is started,
   wherein the next-time judging comprises the steps of:
   measuring again disk usage of said user in each of the network storages, and
   comparing a summation of newly measured disk usages and a write size estimated from a latest write request from said user with said registered disk quota,
   if the summation of the newly measured disk usages and the write size estimated from the latest write request does not exceed the registered disk quota, allowing the latest write request to be executed and updating said threshold value to use for checking on succeeding write requests from said user, and otherwise,
   if the summation exceeds the disk quota, refusing the latest write request from said user and informing said user of a quota error.

2. A method for managing disk usage amount of an user according to claim 1, wherein the threshold value is updated to an accurate amount of disk space remaining for said user calculated based on the registered disk quota and of the summation of the newly measured disk usages of said user and the write size estimated from said latest write request.

3. A method for managing disk usage amount of an user according to claim 1, wherein the accumulated write size is cleared to zero when the accumulated write size exceeds the registered threshold value and it is determined that the summation of the newly measured disk usages and the write size estimated from said latest write request does not exceed the registered disk quota.

* * * * *